(12) United States Patent
Mossoba et al.

(10) Patent No.: US 11,786,826 B1
(45) Date of Patent: Oct. 17, 2023

(54) CARD CUSTOMIZATION VIA A GAMING CONSOLE

(71) Applicant: Capital One Services, LLC, McLean, VA (US)

(72) Inventors: Michael Mossoba, Great Falls, VA (US); Myka Cooper, Woodbridge, VA (US); Trinity D. Moon, Bowie, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/809,670

(22) Filed: Jun. 29, 2022

(51) Int. Cl.
  *A63F 13/79* (2014.01)
  *G07F 17/32* (2006.01)
  *G07F 7/10* (2006.01)
  *G06Q 20/34* (2012.01)

(52) U.S. Cl.
  CPC .......... *A63F 13/79* (2014.09); *G06Q 20/351* (2013.01); *G06Q 20/355* (2013.01); *G07F 7/1008* (2013.01); *G07F 17/3244* (2013.01); *G07F 17/3255* (2013.01)

(58) Field of Classification Search
  None
  See application file for complete search history.

(56) References Cited

U.S. PATENT DOCUMENTS

| | | | | |
|---|---|---|---|---|
| 2011/0178924 A1* | 7/2011 | Briscoe | ................ | G06Q 20/342 705/41 |
| 2012/0323787 A1* | 12/2012 | Nelsen | ................ | G06Q 20/351 705/44 |
| 2018/0158036 A1* | 6/2018 | Zhou | ....................... | G06F 1/163 |
| 2020/0134605 A1* | 4/2020 | Grant | ................ | G06Q 30/0215 |

* cited by examiner

*Primary Examiner* — Jason T Yen
(74) *Attorney, Agent, or Firm* — Harrity & Harrity, LLP

(57) ABSTRACT

In some implementations, a device may receive, from the gaming program, account information for a card associated with an account of a user. The device may receive, via a user interface provided by the gaming program, customization information associated with the card, wherein the customization information includes at least one of: one or more features supported by the card, or one or more design elements to be included on the card. The device may generate a virtual card, associated with the card, based on the customization information. The device may cause the virtual card to be available for display and to be used to perform exchanges in the gaming program or other gaming programs. The device may transmit information associated with the customization information to cause the card to be manufactured or printed according to the customization information.

20 Claims, 7 Drawing Sheets

500 ─┐

510 — Receive, via a user interface, account information, for a card, associated with an account of a user

520 — Provide, in a document object of the user interface, card customization content for presentation by the gaming console, wherein the card customization content includes one or more inputs for selection of customization options associated with the card, and wherein the customization options include at least one of: one or more features supported by the card, or one or more design elements to be included on the card

530 — Obtain presentation information, that is based on the account information, that identifies user content associated with the user

540 — Insert code based on the presentation information into the document object, wherein the code causes the user content to be displayed in connection with the card customization content

550 — Provide the user interface for presentation by the gaming console based on inserting the code into the document object

560 — Receive, via the user interface, an indication of customization information associated with the card

570 — Generate a virtual card, for display by the gaming console, based on the customization information, wherein the virtual card enables exchanges, associated with the account, to be initiated via programs or games executing on the gaming console

FIG. 5

CARD CUSTOMIZATION VIA A GAMING CONSOLE

BACKGROUND

A video game console is an electronic device that outputs a video signal or image to display a video game that can be played by a user with a game controller. Video game consoles may include home consoles which may be placed in a permanent location connected to a television or other display device and controlled with a separate game controller. Video game consoles may also include handheld consoles that include a display unit and controller functions built into the unit such that the handheld console can be played anywhere. Hybrid consoles combine elements of both home and handheld consoles. Video game consoles are a specialized form of a computer devices for video game playing, designed with affordability and accessibility to the general public in mind, but that may be lacking in raw computing power and customizability.

A video game console may include, or may be associated with, a graphical user interface. A graphical user interface is a form of user interface that allows users to interact with electronic devices. A video game or an operating system executing on a video game console may provide a graphical user interface that presents gaming information and/or user profile information.

SUMMARY

Some implementations described herein relate to a system for card customization via a gaming console. The system may include one or more memories and one or more processors coupled to the one or more memories. The one or more processors may be configured to receive, via an application executing on the gaming console, account information, for a card, associated with an account of a user. The one or more processors may be configured to receive, via a user interface provided by the application, customization information associated with the card, wherein the customization information includes at least one of one or more features supported by the card, or one or more design elements to be included on the card. The one or more processors may be configured to generate a virtual card, associated with the card, based on the customization information to be displayed or used in the application or other applications executing on the gaming console. The one or more processors may be configured to receive, via the application, an indication that the virtual card has been presented, in the application, to initiate an exchange, wherein the exchange is a virtual exchange associated with the application or an actual exchange associated with the account. The one or more processors may be configured to communicate, with a device, to perform the exchange using the account information.

Some implementations described herein relate to a method for card customization via a gaming program. The method may include receiving, by a device and from the gaming program, account information for a card associated with an account of a user. The method may include receiving, by the device and via a user interface provided by the gaming program, customization information associated with the card, wherein the customization information includes at least one of, one or more features supported by the card, or one or more design elements to be included on the card. The method may include generating, by the device, a virtual card, associated with the card, based on the customization information. The method may include causing, by the device, the virtual card to be available for display and to be used to perform exchanges in the gaming program or other gaming programs. The method may include transmitting information associated with the customization information to cause the card to be manufactured or printed according to the customization information.

Some implementations described herein relate to a non-transitory computer-readable medium that stores a set of instructions for a gaming console. The set of instructions, when executed by one or more processors of the gaming console, may cause the gaming console to receive, via a user interface, account information, for a card, associated with an account of a user. The set of instructions, when executed by one or more processors of the gaming console, may cause the gaming console to provide, in a document object of the user interface, card customization content for presentation by the gaming console, wherein the card customization content includes one or more inputs for selection of customization options associated with the card, and wherein the customization options include at least one of one or more features supported by the card, or one or more design elements to be included on the card. The set of instructions, when executed by one or more processors of the gaming console, may cause the gaming console to obtain presentation information, that is based on the account information, that identifies user content associated with the user. The set of instructions, when executed by one or more processors of the gaming console, may cause the gaming console to insert code based on the presentation information into the document object, wherein the code causes the user content to be displayed in connection with the card customization content. The set of instructions, when executed by one or more processors of the gaming console, may cause the gaming console to provide the user interface for presentation by the gaming console based on inserting the code into the document object. The set of instructions, when executed by one or more processors of the gaming console, may cause the gaming console to receive, via the user interface, an indication of customization information associated with the card. The set of instructions, when executed by one or more processors of the gaming console, may cause the gaming console to generate a virtual card, for display by the gaming console, based on the customization information, wherein the virtual card enables exchanges, associated with the account, to be initiated via programs or games executing on the gaming console.

BRIEF DESCRIPTION OF THE DRAWINGS

FIGS. 4 and 5 are flowcharts of example processes relating to card customization via a gaming console.

DETAILED DESCRIPTION

Figure 1A:
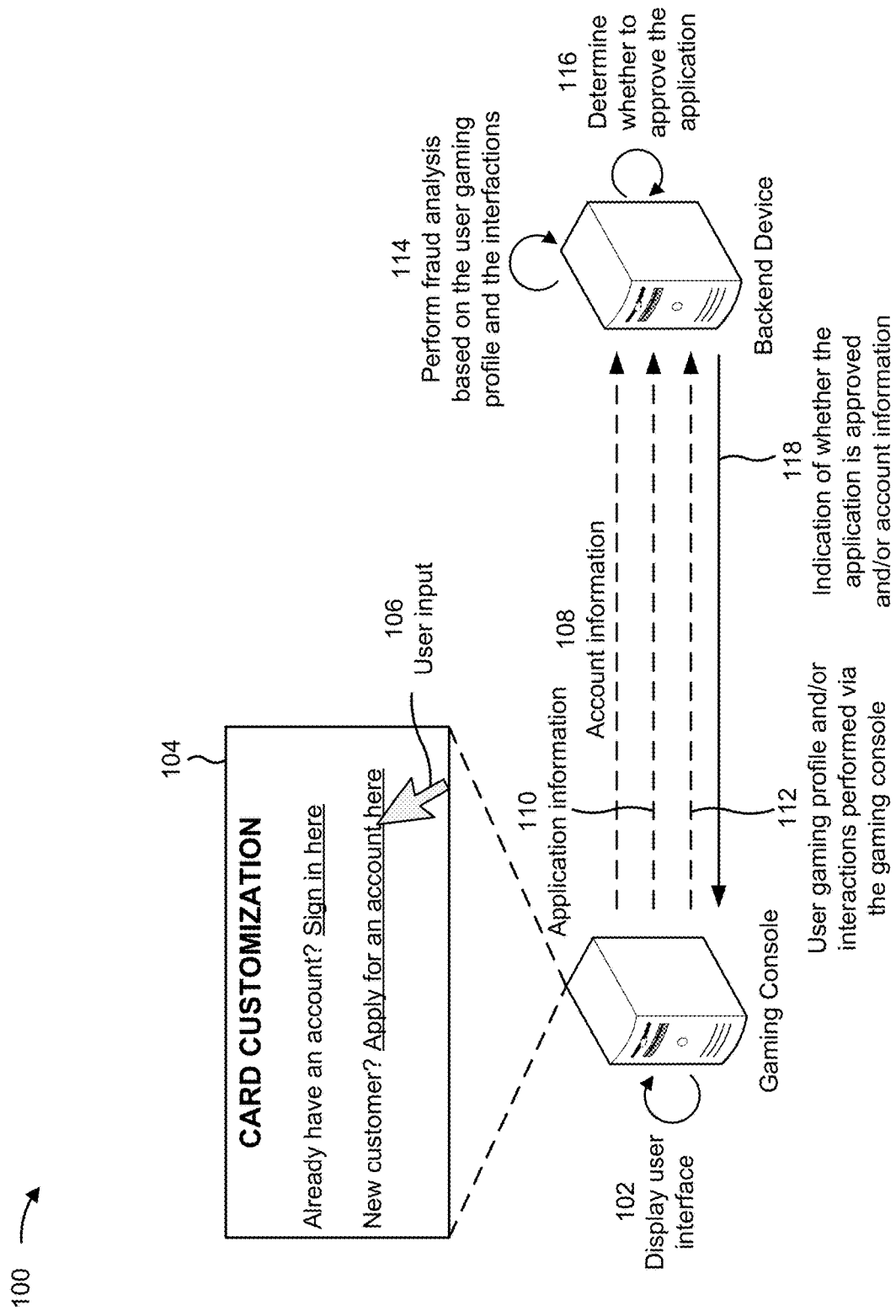
FIGS. 1A-1C are diagrams of an example implementation relating to card customization via a gaming console.

The following detailed description of example implementations refers to the accompanying drawings. The same reference numbers in different drawings may identify the same or similar elements.

In some cases, a video game may be associated with in-game transactions or exchanges. For example, a user may purchase digital assets, virtual currency, or points that are redeemable in the video game, upgrades to be used in the video game, additional features associated with the game, and/or other items that can be purchased by users associated with the video game. To complete in-game transactions or exchanges associated with a video game, a user may be required to input account information or card information, such as the name of the user, a transaction card number, and/or other information (e.g., an expiration date of the transaction card and/or a security code associated with the transaction card). For example, the user may navigate a user interface and/or different pages associated with the video game to input the account information or card information into different fields to enable the user to complete in-game transactions associated with the video game. This consumes excessive computing resources (e.g., processing resources and memory resources) that are needed for a gaming console (e.g., associated with the video game) to navigate through different pages or user interfaces to enable the user to input the account information or card information. As used herein, "gaming console" may refer to a video game console or another device (e.g., a user device or a mobile device) on which a video game or other application is executing. Additionally, because different video games associated with the user may not be coordinated or synchronized (e.g., because the different video games are associated with, or managed by, different entities), the user may be required to input account information or card information for each video game that the user is associated with. This consumes additional computing resources (e.g., processing resources and memory resources) that are needed for a gaming console to navigate through different pages or user interfaces to enable the user to input the account information or card information for each game. However, because different video games may use different platforms for in-game transactions, it may be difficult to synchronize or coordinate a uniform manner to provide the account information or card information associated with a user to multiple video games or multiple in-game platforms (e.g., that are associated with, or managed by, different entities).

Additionally, through technological advances, traditionally offline transactions have become digital. For example, the transactions may be performed via a video game and/or a gaming console, as described above. Additionally, an application process for an account associated with an institution (e.g., a credit card account or another account) may occur via a gaming console. Fraud may be common in digital interactions because digital interactions may rely on text-based authentication information (e.g., passwords, social security numbers, birthdates, and/or the like) to determine a user's identity. Therefore, a fraudulent actor who is able to gain access to the text-based authentication information may be able to impersonate the user and gain access to the user's information and/or apply for an account as the user. This contrasts with in-person interactions, where non-text-based authentication information (e.g., comparing a photo on a driver's license to the person submitting the driver's license to ensure identity) may also serve as authentication information that is less easily imitated.

For example, a provider (e.g., a service provider, merchant, and/or financial institution) may use digital application forms that allow users to apply for a particular service without having to appear in-person at an on-site provider location (e.g., to apply for an account associated with a transaction card). If a fraudulent actor has acquired some or all of the user's authentication information required to complete the application form, the fraudulent actor may exploit the user's identity and apply for the particular service using the user's identity. For example, the fraudulent actor may apply for a transaction card (e.g., a credit card, a debit card, and/or a rewards card) as the user. Moreover, digital applications via a gaming console may present additional difficulties for fraud detection because the gaming console may not be a typical device on which a user conducts digital interactions. For example, the user may typically use a user device or personal computer to conduct digital interactions. Therefore, a fraud detection platform may obtain and/or save information associated with the user device or the personal computer (and/or the user's typical pattern of use with the user device or the personal computer) to aid in fraud detection via the user device or the personal computer. However, if the user performs an application process or a digital transaction via the gaming console, information associated with the user device or the personal computer may not be used by a fraud detection platform to detect fraud, thereby increasing a difficulty associated with detecting fraud (or decreasing a likelihood that the fraud detection platform is able to accurately detect fraud).

These fraudulent activities may negatively impact both the user and an institution. The user may be liable for transactions that arose through the fraudulent action and may attempt to identify and remedy the fraudulent transactions. For example, the user may object to the fraudulent activity, such as by contesting the application, contesting actions that arise out of the application, among other examples. This may waste computing resources associated with a service, because the computing resources are used to attempt to identify and remedy the fraudulent activity. The institution may also be negatively impacted and waste computing resources associated with attempting to reverse the fraudulent activity for the user, along with attempting to identify, detect, and/or diagnose the fraudulent activity.

Some techniques and implementations described herein enable improved card interactions and/or customization via a gaming console. For example, a gaming console and/or a backend device associated with an institution may receive account information, for a card, associated with an account of a user (e.g., where the card and the account are associated with the user). The gaming console (e.g., via a video game or other application) may provide card customization content, for presentation by the gaming console, that includes one or more inputs for selection of customization options associated with the card. The gaming console may receive an indication of customization information, associated with the card, that indicates one or more features to be supported by the card and/or one or more design elements associated with the card. The gaming console and/or the backend device may generate, based on the account information and the customization information, a virtual card for display by the gaming console. The virtual card may be used in one or more video games or other applications to initiate transactions.

For example, rather than being required to input account information or card information, the user (e.g., via an avatar or other means in a video game or application) may present the virtual card in-game. The gaming console and/or the backend device may automatically communicate with a device, associated with an entity that provides or manages the video game, to cause the transaction to be completed (e.g., by communicating the account information and/or the card information to the device). In other words, the user may quickly and easily initiate in-game transactions using the virtual card without navigating away from the video game and without following numerous links or user interfaces from the video game to input account information or card information. In this way, computing resources and/or network resources may be conserved by reducing an amount of navigation performed by the user. Furthermore, the systems described herein make data easier to access by enhancing a user interface, thereby improving a user experience, enhancing user-friendliness of a gaming console and a user interface, and improving the ability of a user to use the gaming console to complete in-game transactions.

Additionally, the gaming console and/or the backend device may enable the user to customize the virtual card to match or imitate a real-world, physical version of the card, thereby improving a user experience and enabling the user to quickly and easily identify the card or account that is to be associated with a given in-game transaction. For example, because the virtual card matches or imitates the look and feel of the physical card, the user may be enabled to quickly and easily identify the card and the account associated with the card without having to navigate to another page to identify account information or card information, such as a card number, associated with the card, thereby conserving computing resources and/or network resources that would have otherwise been used by the user to identify the card and/or the account to be associated with a given in-game exchange. In some implementations, the gaming console and/or the backend device may communicate information to cause the physical card to be manufactured and/or printed according to the customization information provided by the user via an in-game user interface. In some cases, account information may be saved by a video game platform for in-game exchanges. However, a user may be unable to, or may have difficulty, identifying the account solely based on the information saved by the video game platform. By presenting a virtual card that matches or imitates the look and feel of the physical card, the user may be enabled to identify the card and the account quickly and easily.

Additionally, in some implementations, a user may complete an application for an account associated with the card via the same in-game platform that is used to customize the card and generate the virtual card. For example, the user may input application information to the gaming console. The gaming console may transmit, to the backend device, application information associated with an account application for the account associated with the card. In some implementations, the gaming console may transmit, to the backend device, a user gaming profile to facilitate fraud detection associated with the account application using the user gaming profile. For example, the user gaming profile may indicate a typical pattern of use of the gaming console by the user, a gaming behavioral pattern associated with the user, a gaming experience level associated with the user, and/or video games or applications typically played by the user, among other examples. The gaming console may transmit, to the backend device, information associated with one or more user interactions performed via the gaming console proximate to (e.g., within a threshold amount of time before and/or after) a time at which the application information is received by the gaming device. The backend device may determine whether to approve the application based on the user gaming profile and the one or more user interactions. For example, the backend device may be enabled to improve fraud detection associated with the application by comparing the one or more interactions to the user gaming profile. If the one or more interactions do not match the user gaming profile (e.g., as described in more detail elsewhere herein), then the backend device may determine that a fraudulent actor is attempting to apply for the account and the backend device may deny the application. The user gaming profile may be similarly used to detect fraudulent transactions initiated via the gaming console, such as transactions initiated using the virtual card described above. A fraudulent actor may have difficulty imitating the user gaming profile because the user gaming profile may be specific to a gaming preference and/or skill level of the user. This may result in accurate fraud detections because the fraudulent actor may fail to successfully imitate the user gaming profile, thereby enabling the backend device to detect fraudulent applications. This, in turn, saves computing resources used in conjunction with identifying, diagnosing, and remedying fraudulent activity after the fact (e.g., after the fraudulent activity occurs). For example, computing resources used to reverse a transaction or application that resulted from a fraud may be saved.

Figure 1B:
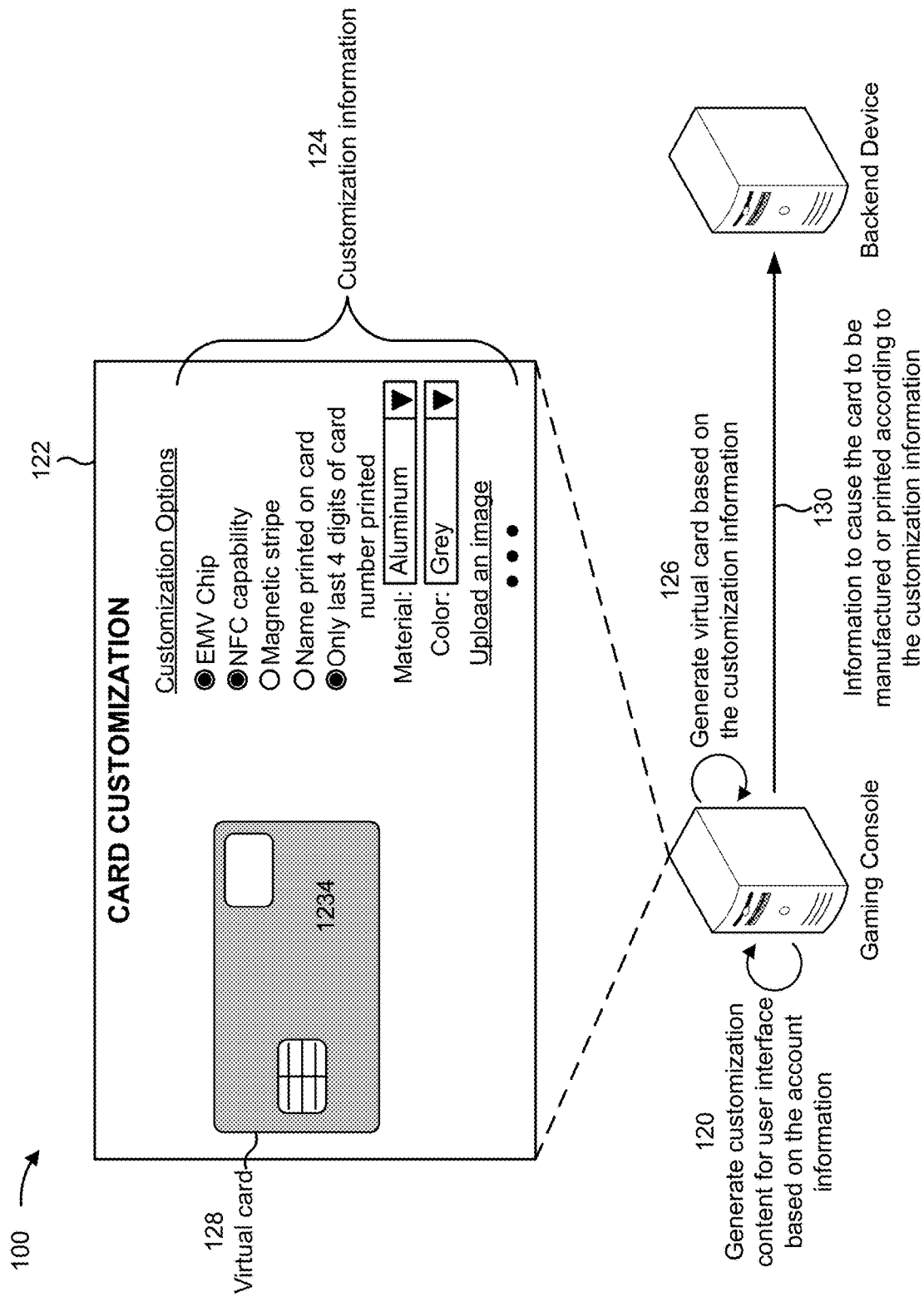
Figure 1C:
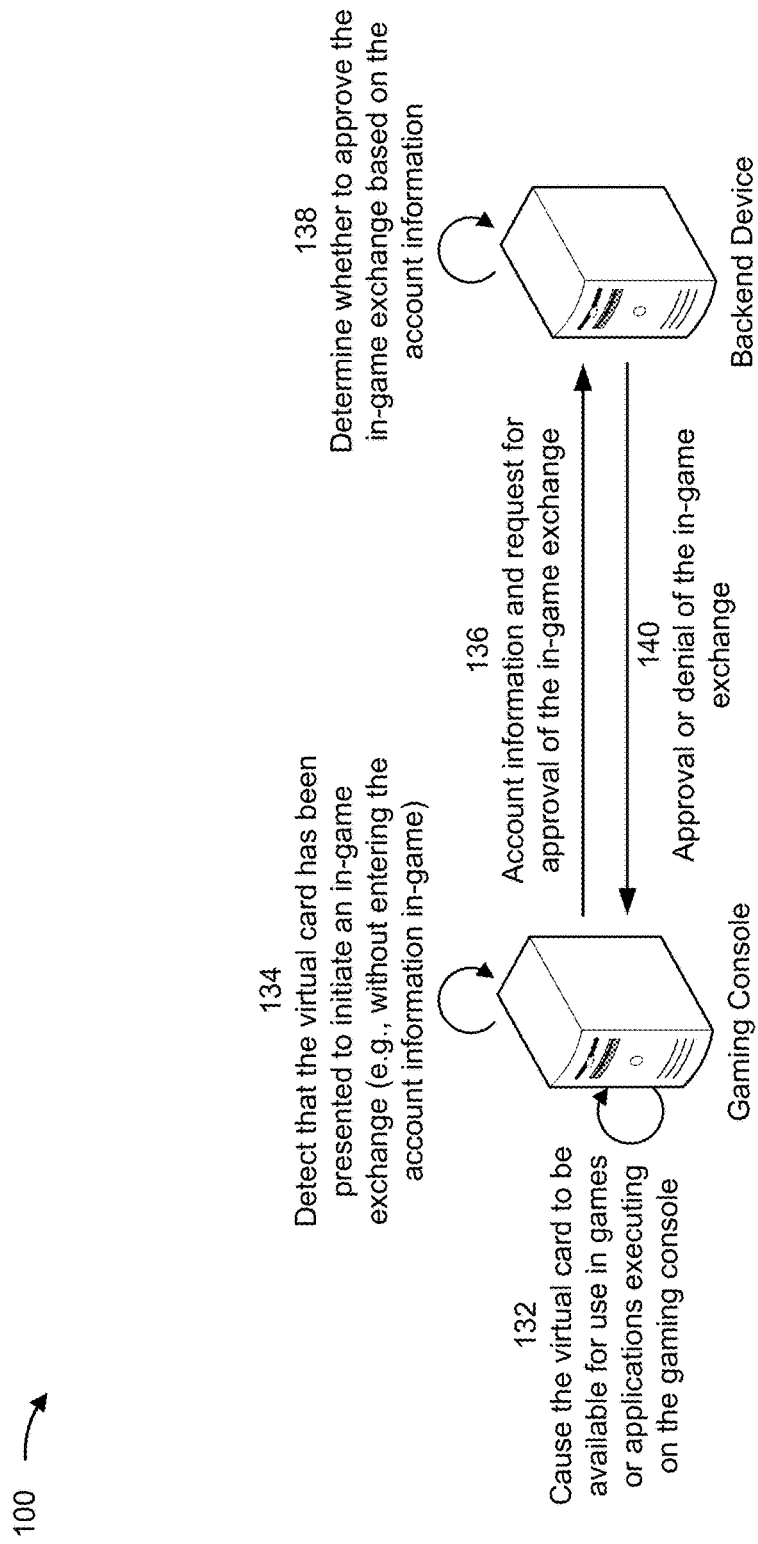

FIGS. 1A-1C are diagrams of an example 100 associated with card customization via a gaming console. As shown in FIGS. 1A-1C, example 100 includes a gaming console and a backend device. In some implementations, example 100 may include multiple backend devices (e.g., associated with different entities or institutions). These devices are described in more detail in connection with FIGS. 2 and 3.

As shown in FIG. 1A, a user may interact with a gaming console to play one or more games (e.g., video games or other applications associated with a game). As described elsewhere herein, the gaming console may be a video game console or another device executing a program or application associated with a game. In some implementations, the gaming console may execute a program (e.g., an application or a gaming program) associated with an institution. The institution may be associated with providing and/or managing accounts associated with transaction cards. In some implementations, the program associated with the institution may be a video game or another game. In some implementations, the program associated with the institution may be included in a video game. In some implementations, the program associated with the institution may be associated with, or presented via, an operating system of the gaming console.

The program associated with the institution may enable a user to customize a card (e.g., a transaction card), apply for an account associated with the card, and/or generate a virtual card to be used for in-game interactions or exchanges associated with games or applications executing on the gaming console, among other examples. As used herein, "exchange" may refer to a transaction, an electronic exchange, a sale, and/or a transfer, among other examples.

As shown by reference number 102, the gaming console may display a user interface. The user interface may be associated with the program that is associated with the institution. For example, the gaming console may obtain presentation information associated with the user interface (e.g., from the backend device or from the program). The presentation information may identify content for the user interface that is to be provided for presentation by the gaming console. For example, the presentation information may identify content for a document object (e.g., a page to be displayed via the gaming console) of the user interface. The document object may be associated with a document object model (DOM) that includes code for generating the document object (e.g., the page). The gaming console may provide the user interface for presentation by the gaming console based on obtaining the presentation information. For example, the gaming console may provide the content of the document object identified by the presentation information in the user interface. In some implementations, the user interface may be provided in a web browser of the gaming console or in the program executing on the gaming console.

As shown by reference number 104, the user interface may include an indication prompting a user to input account information associated with the user. For example, as shown in FIG. 1A, the user interface may include an input option to input the account information (e.g., "Sign in here") and an input option to apply for an account (e.g., "Apply for an account here"). As shown by reference number 106, the gaming console may receive a user input via the user interface. In some implementations, the user input may indicate that the user has selected to input the account information (e.g., indicating that the user already has an account associated with the institution). As a result, the gaming console may cause input options (e.g., fields), to be presented for display via the user interface, associated with providing the account information. For example, the input options (e.g., fields) may enable the user to input the user's name, the user's address, an account identifier (e.g., account number), a transaction card identifier (e.g., card number), login credentials (e.g., a username and password), and/or other information identifying the user and/or the account to enable the backend device to authenticate the user and/or the account. As shown by reference number 108, the gaming console may transmit, and the backend device may receive, the account information associated with the user. In some implementations, the account information may be based on application information provided by the user, as described below (e.g., the account information may be derived from, or may be indicated by, the application information).

In some other implementations, the user input may indicate that the user has selected to apply for an account. For example, the gaming console may receive a request to apply for the account (e.g., based on account information and/or application information, as described in more detail elsewhere herein). As a result, the gaming console may cause input options (e.g., fields), to be presented for display via the user interface, associated with providing application information. For example, the user may use the gaming console to interact with (e.g., view, fill, and/or complete) an application form. The application form may be connected with a service associated with the backend device and the application form may be provided to the gaming console from the backend device and/or the program associated with the institution. The application form may be viewed on a webpage, application, and/or the program, among other examples. The application information may include a name, a birth date, an address, a social security number, income information (e.g., an annual income), and/or other information associated with the user. The gaming console may receive the application information via one or more user inputs to the user interface. As shown by reference number 110, the gaming console may transmit, and the backend device may receive, the application information for the application to open the account associated with the card and/or the institution (e.g., associated with an account application for the account). The account application may be, or may be associated with, a transaction card application (e.g., a credit card application or a debit card application). As described elsewhere herein, the backend device may be associated with the institution that provides and/or manages the account.

In some implementations, as shown by reference number 112, the gaming console may transmit, and the backend device may receive, a user gaming profile associated with the user. The user gaming profile may be based on interactions associated with the user and the gaming console. For example, the user gaming profile may indicate a typical behavior associated with the user and the gaming console. In some implementations, the gaming console may receive permission from the user to track, maintain, and/or transmit the user gaming profile. For example, the gaming console may receive permission from the user to provide the user gaming profile as part of the application information to facilitate fraud detections associated with the application.

The gaming console may track interactions performed by the user, in connection with the gaming console, over time to obtain the user gaming profile. For example, the gaming console may track and/or obtain interactions associated with the user and various video games or applications executing on the gaming console. In some implementations, the user gaming profile may indicate a device identifier of the gaming console that is associated with the user (e.g., that is owned by the user). In some implementations, the user gaming profile may indicate internet service provider information associated with the user and/or the gaming console. For example, the user gaming profile may indicate an internet service provider associated with the user (e.g., that is used to provide internet service for the gaming console), and/or an internet protocol (IP) address associated with the gaming console, among other examples. In some implementations, the user gaming profile may indicate a geographic location associated with the user (e.g., a geographic location or area in which the user typically uses the gaming console). For example, gaming consoles may be less mobile than other devices, such as a mobile device or a mobile phone. Therefore, the geographic location of the gaming console may be used to indicate the user associated with the gaming console (e.g., because the gaming console will typically be kept in a home or residence of a particular user). In some implementations, the user gaming profile may indicate one or more games or applications associated with the user. For example, the user gaming profile may indicate one or more games (e.g., video games) or applications that are owned by the user and/or that have been executed on the gaming console previously.

In some implementations, the user gaming profile may indicate a gaming behavioral pattern associated with the user. The gaming behavioral pattern may indicate a type or category of games typically played by the user (e.g., sports games, first-person shooter games, role playing games, action games, simulation games, and/or other types of games). Additionally, or alternatively, the gaming behavioral pattern may indicate temporal patterns associated with a use of the gaming console by the user. For example, the gaming behavioral pattern may indicate how often the user typically uses the gaming console, a time of day that the user typically uses the gaming console, and/or an amount of time that the user typically uses the gaming console (e.g., in a given sitting), among other examples. In some implementations, the gaming behavioral pattern may indicate a pattern of games typically played by the user (e.g., in an ordered pattern or sequential pattern). In some implementations, the gaming behavioral pattern may indicate which games the user typically plays more often (e.g., as compared to other games owned or played by the user). For example, the gaming behavioral pattern may indicate that the user plays game 1 60% of the time that the user is interacting with the gaming console, game 2 20% of the time that the user is interacting with the gaming console, game 3 5% of the time that the user is interacting with the gaming console, and so on.

In some implementations, the user gaming profile may indicate a gaming experience level associated with the user. The gaming experience level may indicate a skill level associated with the user. For example, the gaming console may track an amount of time that the user has played one or more games (e.g., if the user has spent more time playing a particular game, then the gaming console may determine that the user is more experienced in that particular game), a speed or frequency of inputs for a certain game (e.g., if the user inputs or triggers inputs to the video game faster for certain types of games, such as first-person shooter games, the speed or frequency of the inputs may indicate that the user is more skilled or more experienced for the type of games), scores achieved by the user when playing one or more games, and/or a ranking associated with the user for one or more games (e.g., obtained via one or more platforms associated with the one or more games), among other examples. The gaming experience level may indicate an expected behavior of the user when the user is interacting with or playing one or more games, a particular game, and/or a type or category of games, among other examples.

In some implementations, the gaming console may transmit, to the backend device, the user gaming profile as part of, or included in, the application information. Additionally, or alternatively, the gaming console may transmit, to the backend device, the user gaming profile prior to transmitting the application information.

As further shown by reference number 112, the gaming console may transmit, and the backend device may receive, information associated with one or more user interactions performed via the gaming console. The one or more user interactions may be user interactions with the gaming console that occurred proximate to the time at which the application information was received by the gaming console (e.g., via the user interface displayed by the gaming console). For example, the one or more user interactions may be user interactions with the gaming console that occurred within a threshold amount of time from a time at which a request to apply for an account is received by the gaming console (e.g., within the threshold amount of time before and/or after the time at which the request to apply for the account is received by the gaming console). Additionally, or alternatively, the gaming console may transmit, and the backend device may receive, a device identifier of the gaming console, an indication of a current geographic location of the gaming console, an IP address of the gaming console, and/or an indication of an internet service provider currently providing internet service for the gaming console, among other examples. In some implementations, the information associated with one or more user interactions may be transmitted as part of, or included in, the application information. For example, the information associated with one or more user interactions may facilitate a comparison of the information associated with the one or more user interactions to the user gaming profile for fraud detection purposes, as described in more detail elsewhere herein.

As shown by reference number 114, the backend device may perform a fraud analysis for the application. In some implementations, the fraud analysis may be based on the user gaming profile and the information associated with the one or more user interactions. For example, the backend device may compare the user gaming profile to the information associated with the one or more user interactions to determine whether the information associated with the one or more user interactions matches or aligns with the user gaming profile (e.g., to determine whether the user was actually using the gaming console at the time when the application for the account was submitted to the gaming console). For example, the backend device may compare a device identifier indicated by the information associated with the one or more user interactions to a device identifier indicated by the user gaming profile to determine whether the device (e.g., the gaming console) used to submit the application is the same device (e.g., the same gaming console) that is typically used by the user. If the device identifier indicated by the information associated with the one or more user interactions does not match the device identifier indicated by the user gaming profile (e.g., if a different gaming console was used to submit the application than a gaming console that is typically used by the user), then the backend device may determine that there is a higher likelihood of fraud associated with the application.

As another example, the backend device may identify one or more games indicated by the information associated with the one or more user interactions. The backend device may determine whether the one or more games are included in, or similar to (e.g., in a same category as), one or more games indicated by the user gaming profile. For example, if games played slightly before, or slightly after, the application is submitted are not owned by the user (e.g., as indicated by the user gaming profile) and/or are not a type or category of game typically played by the user (e.g., as indicated by the user gaming profile), then the backend device may determine that there is a higher likelihood of fraud associated with the application. As another example, the backend device may identify a skill level or experience level indicated by the information associated with the one or more user interactions (e.g., based on a speed or frequency of user inputs to a controller, scores obtained in a game, or other information associated with the one or more user interactions). The backend device may compare the skill level or the experience level indicated by the information associated with the one or more user interactions to the skill level or the experience level indicated by the user gaming profile. If the skill level or the experience level indicated by the information associated with the one or more user interactions does not match, or is not similar to, the skill level or the experience level indicated by the user gaming profile, then the backend device may determine that there is a higher likelihood of fraud associated with the application. For example, the backend device and/or the gaming console may determine a first skill score based on the user gaming profile (e.g., using a machine learning model or another model using information described above as inputs to the model). Similarly, the backend device and/or the gaming console may determine a second skill score based on the information associated with the one or more user interactions. The backend device may compare the first skill score to the second skill score to determine a likelihood of fraud associated with the application.

As another example, the backend device may identify a pattern of use or an amount of time that the gaming console is used as indicated by the information associated with the one or more user interactions. The backend device may compare the pattern of use or the amount of time that the gaming console is used to the user gaming profile. If the pattern of use or the amount of time that the gaming console is used does not match, or is not similar to, a typical pattern of use or a typical amount of time that the gaming console is used by the user, then the backend device may determine that there is a higher likelihood of fraud associated with the application.

The factors described above are provided as examples and the backend device may use other information or factors indicated by the information associated with the one or more user interactions and the user gaming profile to determine a likelihood of fraud associated with the application. For example, the backend device may input information associated with the comparisons or factors (e.g., similar to the comparisons or factors described above) into a fraud model (e.g., a machine learning model). The fraud model may output a fraud score indicating the likelihood that the application is associated with fraud. In other words, the backend device may determine a fraud score based on the one or more user interactions and the user gaming profile.

As shown by reference number 116, the backend device may determine whether to approve the account application. The backend device may determine whether to approve the account application based on the likelihood that the application is associated with fraud. For example, the backend device may determine whether to approve the account application based on the fraud score determined by the backend device. For example, the backend device may determine whether to approve the account application based on whether the fraud score satisfied a threshold. Additionally, the backend device may determine whether to approve the account application based on other factors, such as a credit score associated with the user, income information associated with the user, and/or a background check associated with the user, among other examples.

As shown by reference number 118, the backend device may transmit, and the gaming console may receive, an indication of whether the account application is approved (e.g., based on determining whether to approve the account application as described above). For example, the reception of the indication of whether the account application is approved may cause the gaming console to display the indication of whether the account application is approved via the user interface and/or the program executing on the gaming console (e.g., that is associated with the institution that provides and/or manages the account).

In some implementations, the gaming console and/or the backend device may obtain the account information based on the application information. For example, if the account application is approved by the backend device, then the gaming console and/or the backend device may obtain the account information from the application information. Additionally, the backend device may generate the account information (e.g., an account identifier, a card identifier, and/or other account information) if the account application is approved by the backend device. In some implementations, the backend device may transmit, to the gaming console, an indication of the account information generated by the backend device.

As shown in FIG. 1B, and by reference number 120, the gaming console may obtain and/or generate customization content, for a user interface associated with the program, based on the account information associated with the user. For example, the customization content, when displayed by the gaming console, may enable the user to customize a card (e.g., a transaction card) associated with the account via the user interface displayed by the gaming console. For example, the gaming console may provide, in a document object of the user interface, card customization content for presentation by the gaming console. The card customization content may include one or more inputs for selection of customization options associated with the card. In some implementations, the customization options include one or more features supported by the card, and/or one or more design elements to be included on the card, among other examples. The gaming console may obtain presentation information, that is based on the account information, that identifies user content associated with the user (e.g., a card number, a name of the user, and/or other information). The gaming console may insert code based on the presentation information into the document object. The code may cause the user content to be displayed in connection with the card customization content. This may enable the user to visualize user information associated with the user while the user is customizing the card (e.g., such that a model of the card displayed by the user interface displays the user's actual name, card number, and/or other information). The gaming console may provide the user interface for presentation by the gaming console based on inserting the code into the document object.

For example, as shown by reference number 122, the gaming console may display the user interface (e.g., including the user content displayed in connection with the card customization content). As described elsewhere herein, the user interface may be associated with the program or video game that is associated with the institution that provides and/or manages the account associated with the card.

As shown by reference number 124, the user interface may include the one or more inputs for selection of customization options associated with the card. For example, the one or more inputs for selection of customization options may include input options for selecting features to be supported by the card (e.g., one or more functional elements of the card), such as one or more components included in the card, an integrated circuit (IC) chip (e.g., a EUROPAY®, MASTERCARD®, VISA® (EMV) chip), a radio frequency (RF) or near field communication (NFC) capability, a magnetic stripe, a display (e.g., a light-emitting diode (LED) display or another display) to be included on a surface of the card, a battery capability, and/or a memory storage capability (e.g., a size of a memory storage of the card), among other examples. For example, as shown in FIG. 1B, the user may select that the card is to include an EMV chip and an NFC capability, but not include a magnetic stripe.

Additionally, the one or more inputs for selection of customization option may include input options for selecting one or more design elements (e.g., one or more ornamental elements of the card), such as whether the user's name is printed on the card, whether a card number is printed on the card, how many digits of the card number are to be printed on the card (e.g., first half of the digits, the last half of the digits, the last 4 digits, or another quantity of digits), a font, type, size, location, and/or orientation of the card number (e.g., if the card number is to be printed on the card), a material of the card (e.g., metal, plastic, aluminum, or another material), an image to be included on a surface of the card, a pattern to be included on a surface of the card, a color of the card, a color gradient of the card, and/or a computational design to be included on the surface of the card, among other examples. In some implementations, the one or more inputs for selection of customization options may include an option for the user to upload an image or pattern to be included on a surface of the card. In some implementations, the image or pattern may be an image associated with a non-interchangeable unit of data stored on a blockchain (e.g., an image associated with a non-fungible token (NFT)). In some implementations, the one or more inputs for selection of customization options may include input options to enable the user to move a location, on the card, of one or more design elements. For example, as shown by reference number 128, a virtual card may be displayed that is based on the customization information input or selected by the user. The user interface may enable the user to move, on the virtual card, a location of one or more elements, such as a location where the card number is printed, a location where a name is printed, and/or a location where an image is printed, among other examples. As shown in FIG. 1B, the user may select that the card is to not include a name printed on the card, that only the last 4 digits of a card number are to be printed on the card (e.g., to improve security such that a fraudulent actor cannot obtain a full card number by only looking at the card or the virtual card), that the material of the card is to be aluminum, and that the color of the card is to be grey.

As shown by reference number 126, the gaming console may generate a virtual card, for display by the gaming console, based on the customization information provided via the user interface. For example, the gaming console and/or the backend device may generate the virtual card according to the customization information provided by the user and other standard information (e.g., that is the same for all transaction cards associated with the institution) associated with the card, such as a size of the card and/or a location of one or more components or elements, among other examples. As shown by reference number 128, the gaming console may display the virtual card.

Additionally, the gaming console may make the virtual card available for use and/or display in one or more video game platforms (e.g., associated with one or more video games). For example, the gaming console and/or the backend device may communicate with the one or more video game platforms (e.g., via one or more application programming interfaces (APIs)) to make the virtual card available for use and/or display in the one or more video game platforms. In other words, the virtual card may be displayed and/or used to initiate transactions in multiple, different, video games or applications executing on the gaming console.

As shown by reference number 130, the gaming console may transmit, to the backend device (e.g., the same backend device as depicted and described in connection with FIG. 1A or a different backend device associated with the institution), information associated with the customization information to cause the card to be manufactured or printed according to the customization information. For example, the gaming console may receive a user input indicating that a physical card is to be printed according to the customization information. The gaming console may transmit an indication of the customization information provided by, or selected by, the user. The backend device may receive the customization information and may scan or identify whether the customization information can be included on a physical card (e.g., the backend device may scan for illicit images, copyrighted images, profanity, and/or other information or selections that are not be printed on the physical cards). If the backend device identifies any elements or features that cannot be included on a physical card, the backend device may communicate with the gaming console to cause the elements or features to be removed from the virtual card. The backend device may communicate with a platform or an API associated with a card manufacturing operation to cause a physical card to be printed according to the customization information. As a result, a physical card associated with the account and the virtual card associated with the account may have the same look and/or feel. This may enable the user to identify the card and/or the account quickly and easily without having to navigate web pages to identify the account based on a card number alone.

As shown in FIG. 1C, and by reference number 132, the gaming console may cause the virtual card to be available for use in games or applications executing on the gaming console. For example, the user may sign into a user profile or account, associated with the gaming console, that is linked to the virtual card. As a result, the gaming console may cause the virtual card to be available for use and/or display in one or more video games. The virtual card may enable exchanges, associated with the account, to be initiated via programs or games executing on the gaming console.

For example, as shown by reference number 134, the gaming console may detect that the virtual card has been presented to initiate an exchange initiated via the gaming console, such as an in-game exchange. For example, the gaming console may receive (e.g., from an API associated with a program or a game) an indication that the virtual card has been presented to initiate an exchange via the program or the game executing on the gaming console. For example, while playing a game, the user may cause (e.g., via a controller) the virtual card to be presented at a point-of-sale location in the game. In other words, to initiate the exchange, the user may present the card in the game (e.g., in a similar manner as in the real world) without being required to input a card number, an expiration date, and/or other card information. As a result, computing resources may be conserved that would have otherwise been used to navigate to another page or user interface to enable the user to input the card information to initiate the in-game exchange. Although examples are described herein in connection with an in-game exchange, the virtual card can be similarly used to initiate any exchanges or transactions via the gaming console.

The exchange may be associated with an in-game purchase, such as of digital points, digital currency, a feature upgrade, and/or a purchase of additional features or content, among other examples. In some implementations, the exchange may be associated with actual currency (e.g., United States dollars, Euros, or other currency). In some other implementations, the exchange may be associated with virtual currency (e.g., in-game currency that does not have any actual value outside of the game).

The gaming console may communicate, with another device (e.g., the backend device or another device), to perform the exchange using the account information. For example, as shown by reference number 136, the gaming console may transmit, to another device (e.g., the backend device or another device), the account information and a request for approval of the in-game exchange. For example, the gaming console may indicate information associated with the in-game exchange, such as an exchange amount, a date and time of the in-game exchange, an entity associated with the in-game exchange, and/or other exchange information.

As shown by reference number 138, the backend device may determine whether to approve the in-game exchange based on the account information. For example, the backend device may identify the account based on the account information provided by the gaming console. The backend device may determine whether to approve the in-game exchange based on information associated with the account, such as a credit limit, a remaining credit limit, and/or a balance associated with the account, among other examples. Additionally, the backend device may determine whether to approve the in-game exchange based on determining whether the in-game exchange is associated with fraud. For example, the backend device may perform a fraud analysis associated with the in-game exchange based on the user gaming profile and on information associated with one or more user interactions that occurred proximate to the initiation of the in-game exchange (e.g., in a similar, or the same, manner as described in more detail elsewhere herein, such as in connection with FIG. 1A and reference number 114).

As shown by reference number 140, the backend device may transmit, and the gaming console may receive, an indication of whether the in-game exchange is approved. For example, the backend device may transmit an approval or a denial of the in-game exchange. In some implementations, the backend device may transmit the approval or a denial of the in-game exchange directly to a system or platform associated with the game or program executing on the gaming console (e.g., the game or program that is associated with the in-game exchange). The gaming console may communicate (e.g., via an API), with a platform or system associated with the game executing on the gaming console, to cause the in-game exchange to be completed if the backend device indicates that the in-game exchange is approved.

As indicated above, FIGS. 1A-1C are provided as an example. Other examples may differ from what is described with regard to FIGS. 1A-1C.

Figure 2:
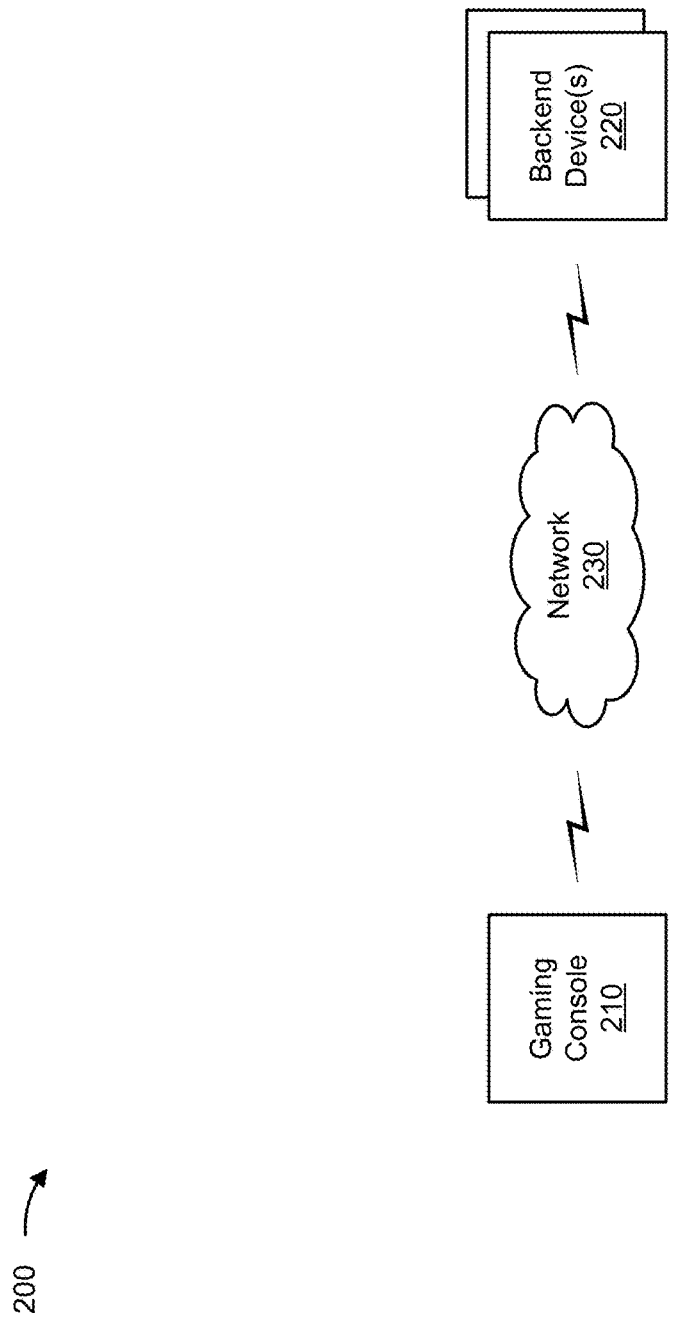
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a gaming console 210, one or more backend devices 220, and a network 230. Devices of environment 200 may interconnect via wired connections, wireless connections, or a combination of wired and wireless connections.

The gaming console 210 includes one or more devices capable of receiving, generating, storing, processing, and/or providing information associated with card customization via the gaming console 210, as described elsewhere herein. The gaming console 210 may include a communication device and/or a computing device. For example, the gaming console 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the gaming console 210 may be a device capable of executing one or more video game applications or programs. The gaming console 210 may include a home console, a stationary console, a handheld console, and/or a portable console, among other examples.

The backend device 220 includes one or more devices capable of receiving, generating, storing, processing, providing, and/or routing information associated with card customization via the gaming console 210, as described elsewhere herein. The backend device 220 may include a communication device and/or a computing device. For example, the backend device 220 may include a server, such as an application server, a client server, a web server, a database server, a host server, a proxy server, a virtual server (e.g., executing on computing hardware), or a server in a cloud computing system. In some implementations, the backend device 220 includes computing hardware used in a cloud computing environment.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
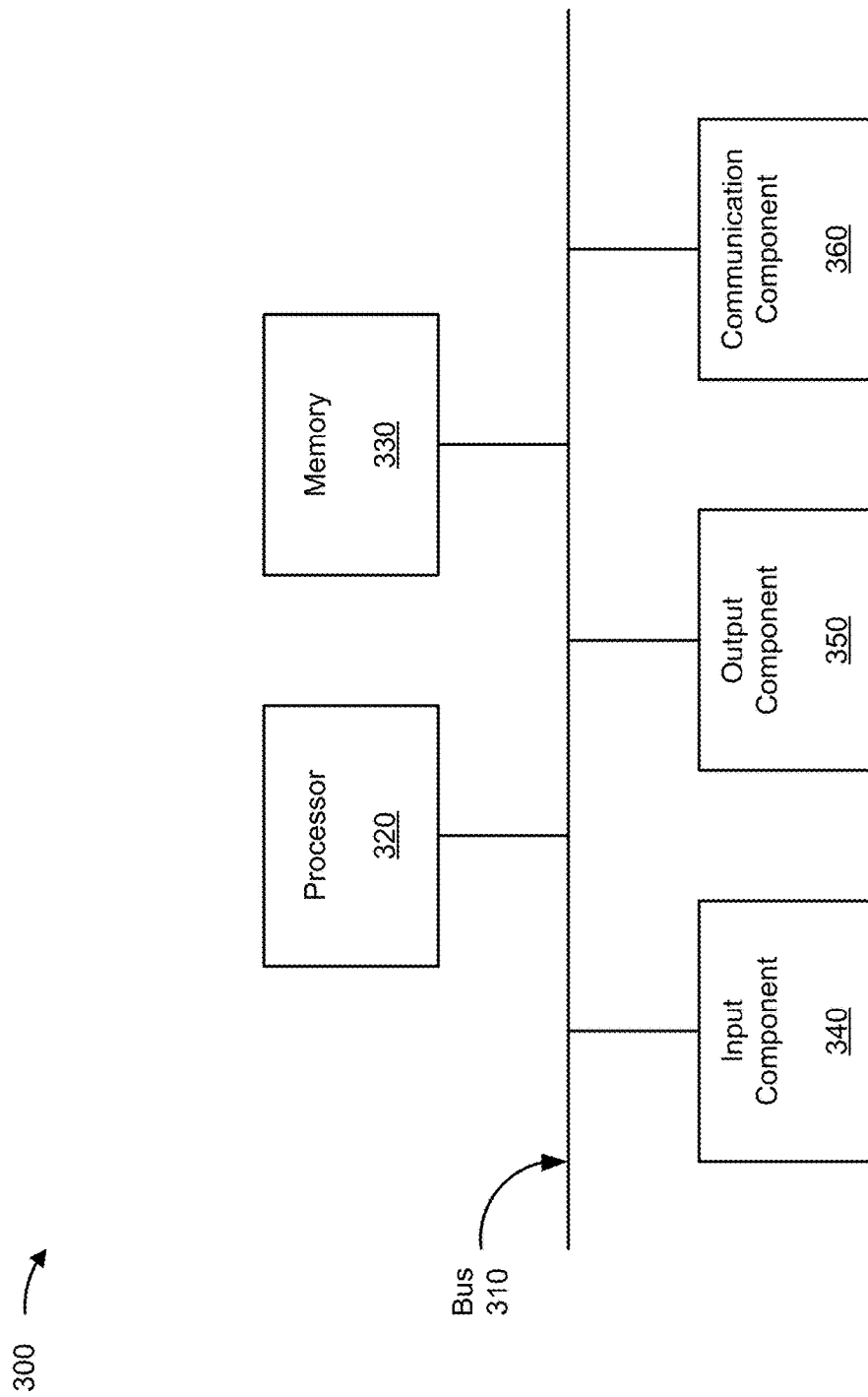
FIG. 3 is a diagram of example components of one or more devices of FIG. 2.

FIG. 3 is a diagram of example components of a device 300, which may correspond to the gaming console 210 and/or the backend device 220. In some implementations, the gaming console 210 and/or the backend device 220 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
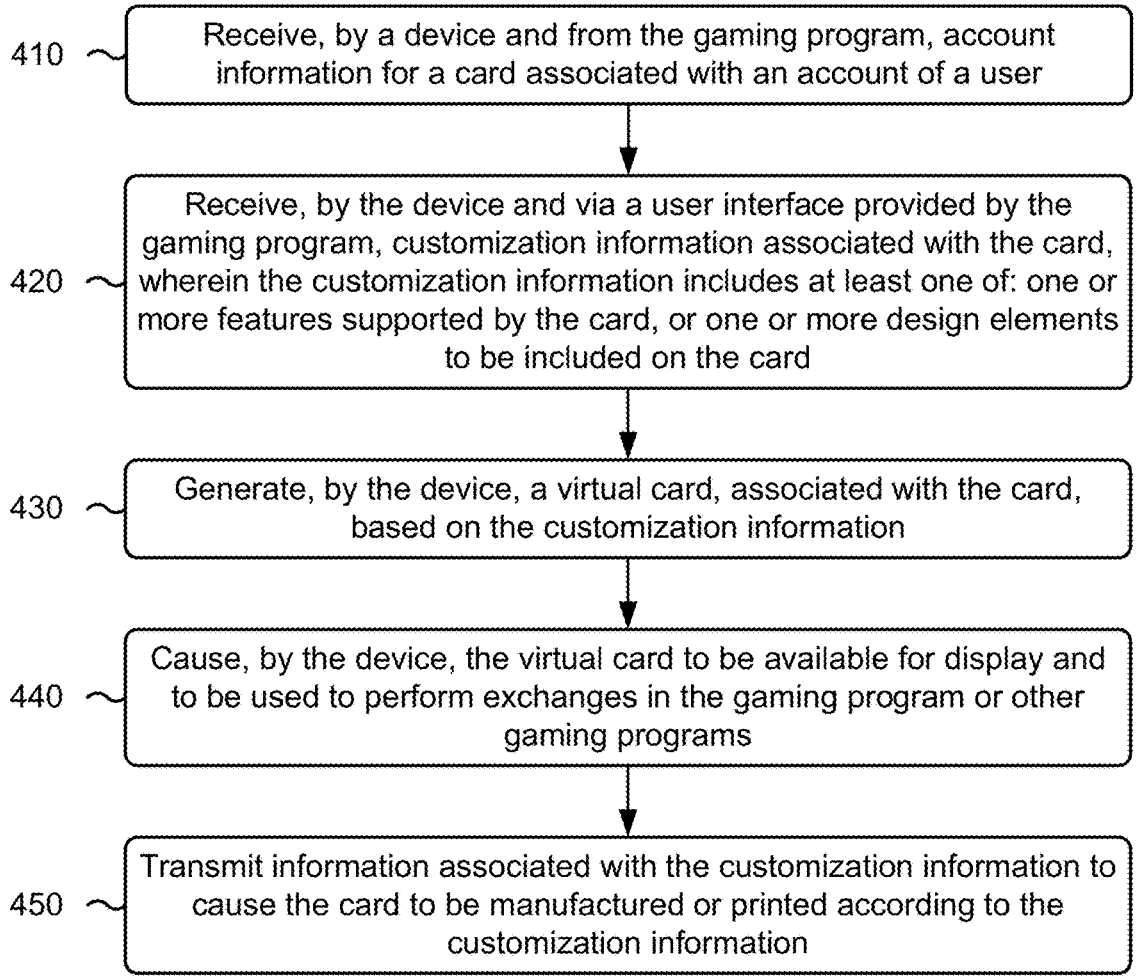

FIG. 4 is a flowchart of an example process 400 associated with card customization via a gaming console. In some implementations, one or more process blocks of FIG. 4 may be performed by a device (e.g., the backend device 220). In some implementations, one or more process blocks of FIG. 4 may be performed by another device or a group of devices separate from or including the device, such as the gaming console 210. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from the gaming program, account information for a card associated with an account of a user (block 410). As further shown in FIG. 4, process 400 may include receiving, via a user interface provided by the gaming program, customization information associated with the card (block 420). In some implementations, the customization information includes at least one of: one or more features supported by the card, or one or more design elements to be included on the card. As further shown in FIG. 4, process 400 may include generating a virtual card, associated with the card, based on the customization information (block 430). As further shown in FIG. 4, process 400 may include causing the virtual card to be available for display and to be used to perform exchanges in the gaming program or other gaming programs (block 440). As further shown in FIG. 4, process 400 may include transmitting information associated with the customization information to cause the card to be manufactured or printed according to the customization information (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C.

FIG. 5 is a flowchart of an example process 500 associated with card customization via a gaming console. In some implementations, one or more process blocks of FIG. 5 may be performed by a device (e.g., the gaming console 210). In some implementations, one or more process blocks of FIG. 5 may be performed by another device or a group of devices separate from or including the device, such as the backend device 220. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, via a user interface, account information, for a card, associated with an account of a user (block 510). As further shown in FIG. 5, process 500 may include providing, in a document object of the user interface, card customization content for presentation by the gaming console (block 520). In some implementations, the card customization content includes one or more inputs for selection of customization options associated with the card. In some implementations, the customization options include at least one of: one or more features supported by the card, or one or more design elements to be included on the card. As further shown in FIG. 5, process 500 may include obtaining presentation information, that is based on the account information, that identifies user content associated with the user (block 530). As further shown in FIG. 5, process 500 may include inserting code based on the presentation information into the document object (block 540). In some implementations, the code causes the user content to be displayed in connection with the card customization content. As further shown in FIG. 5, process 500 may include providing the user interface for presentation by the gaming console based on inserting the code into the document object (block 550). As further shown in FIG. 5, process 500 may include receiving, via the user interface, an indication of customization information associated with the card (block 560). As further shown in FIG. 5, process 500 may include generating a virtual card, for display by the gaming console, based on the customization information (block 570). In some implementations, the virtual card enables exchanges, associated with the account, to be initiated via programs or games executing on the gaming console.

In some implementations, process 500 may include receiving an indication that the virtual card has been presented to initiate an exchange via a program or a game executing on the gaming console. In such examples, process 500 may include communicating, with another device (e.g., the backend device 220), to perform the exchange using the account information. In some implementations, process 500 may include transmitting (e.g., to a backend device 220) information associated with the customization information to cause the card to be manufactured or printed according to the customization information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for card customization via a gaming console, the system comprising:
   one or more memories; and
   one or more processors, coupled to the one or more memories, configured to:
      receive, via an application executing on the gaming console, account information, for a card, associated with an account of a user;
      receive, via a user interface provided by the application, customization information associated with the card, wherein the customization information includes at least one of:
         one or more features supported by the card, or
         one or more design elements to be included on the card;
      generate a virtual card, associated with the card, based on the customization information to be displayed or used in the application or other applications executing on the gaming console;
      receive, via the application, an indication that the virtual card has been presented, in the application, to initiate an exchange, wherein the exchange is a virtual exchange associated with the application or an actual exchange associated with the account; and
      communicate, with a device, to perform the exchange using the account information.

2. The system of claim 1, wherein the one or more processors are further configured to:
   transmit information associated with the customization information to cause the card to be manufactured or printed according to the customization information.

3. The system of claim 1, wherein the one or more processors, to receive the account information, are configured to:
   receive, via the application, a request to apply for the account based on the account information; and
   transmit, to the device or another device, application information, associated with an account application for the account, based on the account information; and
   receive, from the device or the other device, an indication of whether the account application is approved.

4. The system of claim 3, wherein the one or more processors, to transmit the application information, are configured to:
   transmit an indication of a user gaming profile to facilitate fraud detection associated with the account application using the user gaming profile, wherein the user gaming profile indicates at least one of:
      a device identifier of the gaming console,
      internet service provider information associated with the user,
      a geographic location associated with the user,
      one or more games or applications associated with the user,
      a gaming behavioral pattern associated with the user, or
      a gaming experience level associated with the user.

5. The system of claim 4, wherein the one or more processors are further configured to:
   transmit, to the device or the other device, information associated with one or more user interactions performed via the gaming console, wherein the one or more user interactions occur within a threshold amount of time from a time at which the request to apply for the account is received to facilitate a comparison of the information associated with the one or more user interactions to the user gaming profile for fraud detection purposes.

6. The system of claim 1, wherein the one or more features supported by the card include at least one of:
- one or more components included in the card,
- an integrated circuit (IC) chip,
- a radio frequency (RF) or near field communication (NFC) capability, or
- a magnetic stripe.

7. The system of claim 1, wherein the one or more design elements include at least one of:
- whether a card number is printed on the card;
- a font, type, size, location, or orientation of the card number;
- a material of the card; or
- an image to be included on the card.

8. A method for card customization via a gaming program, comprising:
- receiving, by a device and from the gaming program, account information for a card associated with an account of a user;
- receiving, by the device and via a user interface provided by the gaming program, customization information associated with the card, wherein the customization information includes at least one of:
  - one or more features supported by the card, or
  - one or more design elements to be included on the card;
- generating, by the device, a virtual card, associated with the card, based on the customization information;
- causing, by the device, the virtual card to be available for display and to be used to perform exchanges in the gaming program or other gaming programs; and
- transmitting information associated with the customization information to cause the card to be manufactured or printed according to the customization information.

9. The method of claim 8, further comprising:
- receiving, by the device and from the gaming program, an indication that the virtual card has been presented, in the gaming program, to initiate an exchange, wherein the exchange is a virtual exchange associated with the gaming program or an actual exchange associated with the account; and
- communicating, by the device and with another device, to perform the exchange using the account information.

10. The method of claim 8, wherein receiving the account information comprises:
- receiving application information associated with an account application for the account;
- determining whether to approve the account application; and
- transmitting, to the gaming program and based on determining whether to approve the account application, an indication of whether the account application is approved to cause the indication of whether the account application is approved to be displayed via the gaming program, and wherein the account information is based on the application information.

11. The method of claim 10, wherein receiving the application information comprises:
- receiving a user gaming profile to facilitate fraud detection associated with the account application using the user gaming profile.

12. The method of claim 11, further comprising:
- receiving, from the gaming program, information associated with one or more user interactions performed via the gaming program, wherein the one or more user interactions occur within a threshold amount of time from a time at which the application information is received; and wherein determining whether to approve the account application comprises:
- determining a fraud score based on the one or more user interactions and the user gaming profile; and
- determining whether to approve the account application based on the fraud score.

13. The method of claim 8, wherein the one or more features supported by the card include at least one of:
- one or more components included in the card,
- an integrated circuit (IC) chip,
- a radio frequency (RF) or near field communication (NFC) capability, or
- a magnetic stripe.

14. The method of claim 8, wherein the one or more design elements include at least one of:
- a color of the card,
- a color gradient of the card, or
- a pattern to be included on the card.

15. A non-transitory computer-readable medium storing a set of instructions, the set of instructions comprising:
- one or more instructions that, when executed by one or more processors of a gaming console, cause the gaming console to:
  - receive, via a user interface, account information, for a card, associated with an account of a user;
  - provide, in a document object of the user interface, card customization content for presentation by the gaming console, wherein the card customization content includes one or more inputs for selection of customization options associated with the card, and wherein the customization options include at least one of:
    - one or more features supported by the card, or
    - one or more design elements to be included on the card;
  - obtain presentation information, that is based on the account information, that identifies user content associated with the user;
  - insert code based on the presentation information into the document object, wherein the code causes the user content to be displayed in connection with the card customization content;
  - provide the user interface for presentation by the gaming console based on inserting the code into the document object;
  - receive, via the user interface, an indication of customization information associated with the card; and
  - generate a virtual card, for display by the gaming console, based on the customization information, wherein the virtual card enables exchanges, associated with the account, to be initiated via programs or games executing on the gaming console.

16. The non-transitory computer-readable medium of claim 15, wherein the one or more instructions, when executed by the one or more processors, further cause the gaming console to:
- receive an indication that the virtual card has been presented to initiate an exchange via a program or a game executing on the gaming console; and
- communicate, with another device, to perform the exchange using the account information.

17. The non-transitory computer-readable medium of claim 15, wherein the one or more instructions, when executed by the one or more processors, further cause the gaming console to:
- transmit information associated with the customization information to cause the card to be manufactured or printed according to the customization information.

18. The non-transitory computer-readable medium of claim 15, wherein the one or more instructions, when executed by the one or more processors, further cause the gaming console to:
  receive, via the user interface, application information for an application to open the account;
  transmit, to another device, the application information;
  receive, from the other device, an indication of whether the application to open the account is approved; and
  provide, for presentation via the user interface, an indication of whether the application to open the account is approved.

19. The non-transitory computer-readable medium of claim 18, wherein the one or more instructions, when executed by the one or more processors, further cause the gaming console to:
  transmit, to the other device, an indication of a user gaming profile to facilitate fraud detection associated with the application using the user gaming profile; and
  transmit, to the other device, information associated with one or more user interactions performed via the gaming console, wherein the one or more user interactions occur within a threshold amount of time from a time at which the application information is received.

20. The non-transitory computer-readable medium of claim 19, wherein the user gaming profile indicates at least one of:
  a device identifier of the gaming console,
  internet service provider information associated with the user,
  a geographic location associated with the user,
  one or more games or applications associated with the user,
  a gaming behavioral pattern associated with the user, or
  a gaming experience level associated with the user.

* * * * *